United States Patent
Fukui (10) Patent No.: US 10,978,287 B2
(45) Date of Patent: Apr. 13, 2021

(54) ESI SPRAYER AND IONIZER

(71) Applicant: SHIMADZU CORPORATION, Kyoto (JP)

(72) Inventor: Wataru Fukui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/625,138

(22) PCT Filed: Sep. 14, 2017

(86) PCT No.: PCT/JP2017/033298
§ 371 (c)(1),
(2) Date: Dec. 20, 2019

(87) PCT Pub. No.: WO2019/053851
PCT Pub. Date: Mar. 21, 2019

(65) Prior Publication Data
US 2020/0234940 A1    Jul. 23, 2020

(51) Int. Cl.
*H01J 49/16*    (2006.01)
*G01N 30/72*    (2006.01)
*H01J 49/04*    (2006.01)

(52) U.S. Cl.
CPC ........ *H01J 49/165* (2013.01); *G01N 30/7233* (2013.01); *H01J 49/0404* (2013.01);
(Continued)

(58) Field of Classification Search
CPC .. H01J 49/165; H01J 49/0431; H01J 49/0404; H01J 49/0445; H01J 49/167;
(Continued)

(56) References Cited

U.S. PATENT DOCUMENTS 5,572,023 A    11/1996 Caprioli
2010/0072748 A1*  3/2010 Van Pelt ............... F16L 19/065
                                                                    285/343
(Continued)

FOREIGN PATENT DOCUMENTS

JP    2014-509059 A    4/2014
JP    2015-014616 A    1/2015

OTHER PUBLICATIONS

"Connector, adapters, Unions", M&S Instruments Inc., Aug. 9, 2017, <URL: http://www.technosaurus.co.jp/categories/view/194>.
(Continued)

*Primary Examiner* — Kiet T Nguyen
(74) *Attorney, Agent, or Firm* — Sughrue Mion, PLLC (57) ABSTRACT

An ESI sprayer 211 configured to be used by being attached to a first hole 51 made in a housing 50 of an ionizer and a second hole 52 made at an end of the first hole 51, and the second hole 52 having an inner diameter smaller than that of the first hole 51, the second hole 52 having an end communicating with an ionization chamber 210, the ESI sprayer 211 includes: a first pipe 11 having an outer diameter smaller than an inner diameter of the first hole 51; a second pipe 12 having an outer diameter smaller than an inner diameter of the second hole 52; a pipe connecting jig 14 made of a conductive material and connecting end faces of the first pipe 11 and the second pipe 12 separated from each other; and a pipe protecting member 16 configured to be an extendable tubular body made of a conductive material and having an outer diameter smaller than the inner diameter of the first hole 51 and larger than the inner diameter of the second hole 52, the pipe protecting member 16 having one end fixed to the pipe connecting jig and being disposed so as to cover at least the end of the second pipe 52.

12 Claims, 4 Drawing Sheets

(52) U.S. Cl.
CPC ...... *H01J 49/0431* (2013.01); *H01J 49/0445* (2013.01); *H01J 49/167* (2013.01)

(58) Field of Classification Search
CPC . G01N 30/7233; G01N 30/7266; G01N 27/62
USPC ........................................................ 250/288
See application file for complete search history.

(56) References Cited

U.S. PATENT DOCUMENTS

| | | | |
|---|---|---|---|
| 2014/0047905 A1 | 2/2014 | Tomany et al. | |
| 2014/0305801 A1* | 10/2014 | Peterson .......... | G01N 27/44743 204/604 |
| 2018/0017534 A1* | 1/2018 | Robson .............. | G01N 30/7266 |

OTHER PUBLICATIONS

International Search Report for PCT/JP2017/033298 dated Nov. 14, 2017 (PCT/ISA/210).
Written Opinion of the International Searching Authority for PCT/JP2017/033298 dated Sep. 14, 2017 (PCT/ISA/237).

* cited by examiner

ESI SPRAYER AND IONIZER

CROSS REFERENCE TO RELATED APPLICATIONS

This application is a National Stage of International Application No. PCT/JP2017/033298 filed Sep. 14, 2017.

TECHNICAL FIELD

The present invention relates to an ESI sprayer and an ionizer used to ionize a liquid sample in an ion analyzer such as a mass spectrometer.

BACKGROUND ART

A liquid chromatograph is widely used as an apparatus that analyzes a component contained in a liquid sample. In the liquid chromatograph, the liquid sample is introduced into a column on a flow of a mobile phase, and various components contained in the liquid sample are temporally separated, and measured with a detector. The liquid chromatograph having a mass spectrometer as the detector is called a liquid chromatograph mass spectrometer. In the liquid chromatograph mass spectrometer, various components sequentially eluted from a column of a liquid chromatograph are ionized by introducing the various components into the ion source of the mass spectrometer, and the generated ions are measured in each mass-to-charge ratio. In the ion source, for example, an eluate from the column is introduced into a pipe of an ESI sprayer to which a predetermined ionization voltage (ESI voltage) is applied and charged, finely charged droplets are formed and nebulized in the ionization chamber by blowing a nebulizer gas such as a nitrogen gas to the eluate, and desolvation and ionization are performed in the ionization chamber.

In the liquid chromatograph mass spectrometers, so-called nano-ESI or micro-ESI is widely used in recent years to measure a very small amount of components contained in a sample with high sensitivity. In the nano-ESI or the micro-ESI, a small-diameter column is used, and the amount of eluate per unit time introduced into the ESI sprayer is reduced to control a flow rate of the mobile phase from a nL/min level to a μL/min level. This increases charging efficiency and facilitates the solvent removal, and thus increases the ionization efficiency.

In the nano-ESI or the micro-ESI, a capillary having an outer diameter of several hundreds of micrometers and an inner diameter of several tens of micrometers is used to introduce a small amount of eluate into the ESI sprayer as described above. These capillaries are fragile and easily damaged when a user inadvertently brings an end of the capillary into contact with another member in attaching or removes the ESI sprayer to or from the mass spectrometer. Patent Literature 1 proposes an ESI sprayer including a sheath member which is a tube attached to an outer circumference of the capillary of the ESI sprayer so as to freely move over the capillary. The sheath member protects the end of the capillary when the capillary is removed from the mass spectrometer (during non-use). When the capillary is inserted into a hole made in the housing of the mass spectrometer (during use), the sheath member abuts the protrusion protruding from the inner wall of the hole, and retreats to expose the end of the capillary. The ESI sprayer is used not only in the liquid chromatograph mass spectrometer but also as the ion source that ionizes the liquid sample in various ion analyzers.

CITATION LIST

Patent Literature

Patent Literature 1: JP 2014-509059 A
Patent Literature 2: JP 2015-14616 A

Non Patent Literature

Non Patent Literature 1: "Connector Adapter Union", [online], MS Equipment Co., Ltd., [Search on Aug. 9, 2017], Internet

SUMMARY OF INVENTION

Technical Problem

Preferably, a material that is easily microfabricated and hardly adsorb a substance is used as the above capillary used in the nano ESI or the micro ESI. Fused silica (fused quartz) is an example of such a material. The liquid sample flowing through the pipe made of fused silica cannot be charged from outside because fused silica is an insulator. For this reason, conventionally there has been proposed a configuration in which the ESI sprayer pipe is divided into two semi-pipes to provide a connection gap between the two semi-pipes using a conductive pipe connecting jig (for example, see Patent Literature 2 and Non Patent Literature 1). In this configuration, the liquid sample can be charged in the connection gap by applying a predetermined ionization voltage (ESI voltage) to the pipe connecting jig.

When the configuration described in Patent Literature 2 or Non Patent Literature 1 is incorporated in the configuration of the ESI sprayer described in Patent Literature 1, it is necessary to also dispose the pipe connecting jig in the sheath member in order to protect the connection gap from the damage along with the pipe. In this case, it is necessary to add a configuration that secures a conductive path for applying the ESI voltage to the pipe connecting jig, which results in a problem in that the number of components of the ESI sprayer is increased, and the manufacturing cost is increased.

The problem to be solved by the present invention is to provide an ESI sprayer that can protect the end of the capillary through which the liquid sample flows while suppressing manufacturing cost, and the ESI sprayer in which a pipe made of an insulator such as fused silica can be used.

Solution to Problem

One aspect of the present invention is an ESI sprayer configured to be used by being attached to a first hole made in a housing of an ionizer and a second hole made at an end of the first hole, the second hole having an inner diameter smaller than an inner diameter of the first hole, the second hole having an end communicating with an ionization chamber, the ESI sprayer including:

a) a first pipe having an outer diameter smaller than an inner diameter of the first hole;

b) a second pipe having an outer diameter smaller than an inner diameter of the second hole;

c) a pipe connecting jig made of a conductive material and connecting end faces of the first pipe and the second pipe separated from each other; and d) a pipe protecting member configured to be an extendable tubular body made of a conductive material and having an outer diameter smaller than the inner diameter of the first hole and larger than the inner diameter of the second hole, the pipe protecting member having one end fixed to the pipe connecting jig and being disposed so as to cover at least an end of the second pipe.

In the ESI sprayer of the present invention, the liquid sample is introduced from the first pipe, and flows toward the second pipe connected to the first pipe by the pipe connecting jig. That is, the second pipe is used while disposed on the end toward the ESI sprayer. The pipe connecting jig connects the end face of the first pipe and the end face of the second pipe which are separated from each other. Thus, even if both the first pipe and the second pipe are made of an insulator such as fused silica, the liquid sample can be charged in the separation portion (connection gap) between the first pipe and the second pipe by applying a predetermined ionization voltage (ESI voltage) to the pipe connecting jig made of a conductive material. One end of the pipe protecting member made of the conductive material contacts with the pipe connecting jig, so that the liquid sample flowing through the connection gap can easily be charged through the pipe protecting member and the pipe connecting jig by applying the ESI voltage from the other end side of the pipe protecting member. That is, in the ESI sprayer of the present invention, because the pipe protecting member is also used as the component constituting the conductive path, it is not necessary to add the component for securing the conductive path through which the ESI voltage is applied to the pipe connecting jig, and the number of components can be reduced, so that the ESI sprayer can be manufactured at low cost.

In the ESI sprayer according to the present invention, because the pipe protecting member is disposed so as to cover at least the end of the second pipe, the pipe protecting member protects the second pipe when the ESI sprayer is not used (not attached to the housing of the ionizer). Because the outer diameter of the pipe protecting member is larger than the inner diameter of the second hole, when the ESI sprayer is inserted from the first hole of the housing of the ionizer, the pipe protecting member does not proceed after reaching an inlet of the second hole, the pipe connecting jig is contracted to expose the second pipe, and the second pipe is inserted into the second hole.

Advantageous Effects of Invention

In the ESI sprayer of the present invention, the end of the capillary through which the liquid sample flows can be protected while the manufacturing cost is suppressed. The material, such as a fused silica, which is made of the insulator, can be used as the pipe through which the liquid sample flows.

DESCRIPTION OF EMBODIMENTS

Figure 1:
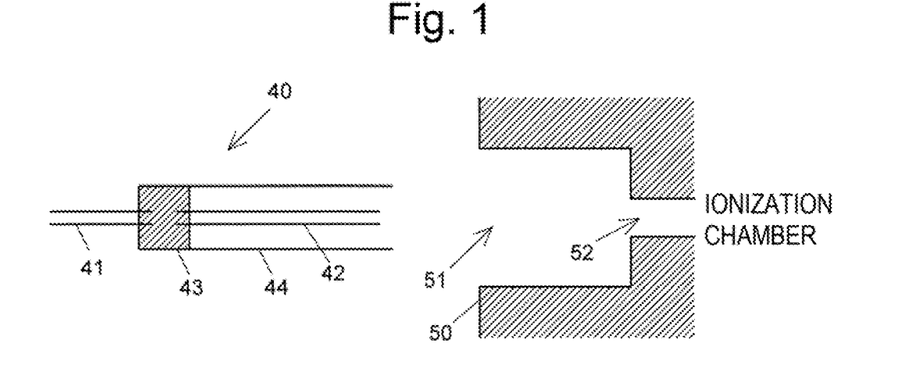
FIG. 1 is an example schematically illustrating arrangement of main components of an ESI sprayer according to the present invention.

Main components of an embodiment of an ESI sprayer according to the present invention will be described before the embodiment of the ESI sprayer of the present invention is described. FIG. 1 is a view schematically illustrating the main components along with an attachment unit of the ESI sprayer formed in a housing 50 of an ionizer.

A first hole 51 and a second hole 52 are made in the housing 50 of the ionizer. The second hole 52 is made at a tip of the first hole 51, and has an inner diameter smaller than that of the first hole 51, and an end of the second hole 52 communicates with an ionization chamber. An ESI sprayer 40 includes a first pipe 41, a second pipe 42, a pipe connecting jig 43, and a pipe protecting member 44. An outer diameter of the first pipe 41 is smaller than an inner diameter of the first hole 51, and an outer diameter of the second pipe 42 is smaller than an inner diameter of the second hole 52. The pipe connecting jig 43 is made of a conductive material, and both the first pipe 41 and the second pipe 42 are connected to each other while end faces of the first pipe 41 and the second pipe 42 are separated from each other (while a connection gap is formed between both the end faces). The pipe protecting member 44 is made of a conductive material, and is a tubular body that is extendable (in a longitudinal direction) and has the outer diameter that is smaller than the inner diameter of the first hole 51 and larger than the inner diameter of the second hole 52. The pipe protecting member 44 is disposed such that one end of the pipe protecting member 44 is fixed to the pipe connecting jig 43 to cover an entire length of the second pipe 42. The pipe protecting member 44 may be disposed so as to cover at least the end of the second pipe 42. The pipe protecting member 44 covering the entire length of the second pipe 42 as in the present embodiment is a preferred mode, but is not an essential requirement.

Figure 2:
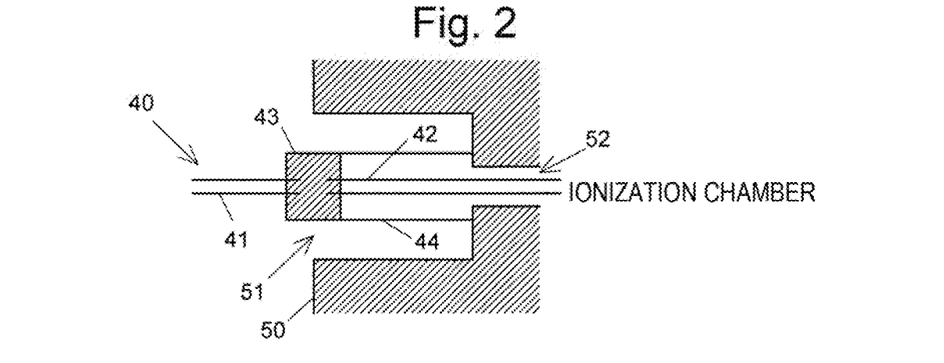
FIG. 2 is a view illustrating a state in which the ESI sprayer of the above example is inserted into a hole made in a housing of a mass spectrometer.

In the ESI sprayer 40, a liquid sample is introduced from the first pipe 41, and flows toward the second pipe 42 through the connection gap formed in the pipe connecting jig 43. That is, the second pipe 42 is disposed so as to be located on the end side (ionization chamber side) of the ESI sprayer 40. The liquid sample is charged in the connection gap between the first pipe 41 and the second pipe 42 by applying a predetermined ionization voltage (ESI voltage) from a voltage application unit (not illustrated) to the pipe connecting jig 43 made of the conductive material. One end of the pipe protecting member 44 made of the conductive material contacts with the pipe connecting jig 43, and the liquid sample flowing through the connection gap is charged through the pipe protecting member 44 and the pipe connecting jig 43 by applying the ESI voltage from the other end side of the pipe protecting member 44.

The pipe protecting member 44 is disposed so as to cover the entire length of the second pipe 42, and the pipe protecting member 44 protects the second pipe 42 when the ESI sprayer 40 is not used (not attached to the housing 50 of the ionizer). Because the outer diameter of the pipe protecting member 44 is larger than the inner diameter of the second hole 52, when the ESI sprayer 40 is inserted from the first hole 51 of the housing 50 of the ionizer, the pipe protecting member 44 does not proceed after reaching an inlet of the second hole 52, the pipe connecting jig 44 is contracted to expose the second pipe 42, the second pipe 42 is inserted into the second hole 52, and the end of the second pipe 42 protrudes slightly in the ionization chamber 210 through the second hole 52 (see FIG. 2).

Figure 3:
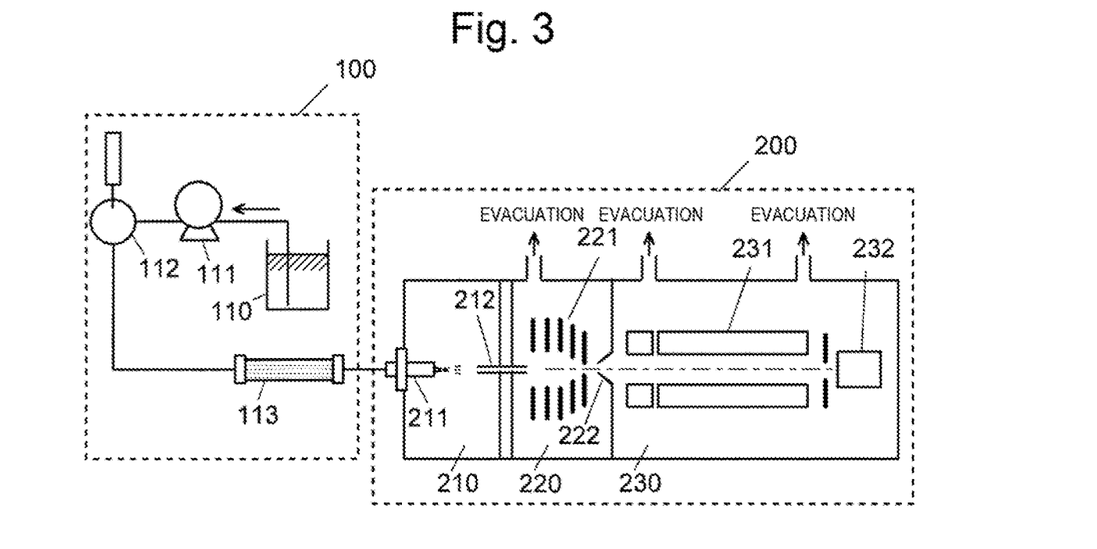
FIG. 3 is a block diagram illustrating a main part of an entire liquid chromatograph mass spectrometer including an embodiment of an ESI sprayer and an ionizer according to the present invention.

A specific embodiment of the ESI sprayer and the ionizer according to the present invention will be described below with reference to the drawings. The ESI sprayer and the ionizer of the embodiment are used to ionize the eluate from the column in the liquid chromatograph mass spectrometer. FIG. 3 illustrates a configuration of a main part in the liquid chromatograph mass spectrometer of the embodiment.

The liquid chromatograph mass spectrometer of the embodiment roughly includes a liquid chromatograph 100 and a mass spectrometer 200, and operation of each unit is controlled by a controller (not illustrated). The liquid chromatograph 100 includes a mobile phase container 110 in which a mobile phase is stored, a pump 111 that sucks the mobile phase and delivers the mobile phase at a constant flow rate, an injector 112 that injects a predetermined amount of liquid sample into the mobile phase, and a column 113 that separates various compounds contained in the liquid sample in a time direction, and a column oven (not illustrated) that controls a temperature of the column 113. An autosampler (not illustrated) that introduces a plurality of liquid samples into the injector 112 one by one is The mass spectrometer 200 has a configuration of a differential evacuation system including an ionization chamber 210 that is substantially atmospheric pressure, an intermediate vacuum chamber 220 evacuated by a vacuum pump (not illustrated), and a high-vacuum analysis chamber 230. An ESI sprayer 211 that nebulizes a sample solution while applying a charge to the sample solution is installed in the ionization chamber 210. The ionization chamber 210 and the subsequent-stage intermediate vacuum chamber 220 communicate with each other through a small-diameter heated capillary 212. An ion guide 221 that transports ions to the subsequent stage while converging the ions is provided in the intermediate vacuum chamber 220, and the intermediate vacuum chamber 220 and the analysis chamber 230 are separated from each other by a skimmer 222 including a small hole at the top. A quadrupole mass filter 231 and an ion detector 232 are installed in the analysis chamber 230. In the embodiment, the mass spectrometer has a simple quadrupole type configuration. Alternatively, a mass spectrometer having another configuration (such as a triple quadrupole type, an ion trap-time-of-flight type, or the like) may be used.

The mass spectrometer 200 can perform SIM (selected ion monitoring) measurement and MS scan measurement. In the SIM measurement, ions are detected while a mass-to-charge ratio of ions passing through the quadrupole mass filter 231 is fixed. In the MS scan measurement, ions are detected while the mass-to-charge ratio of ions passing through the quadrupole mass filter 231 is scanned.

Figure 4:
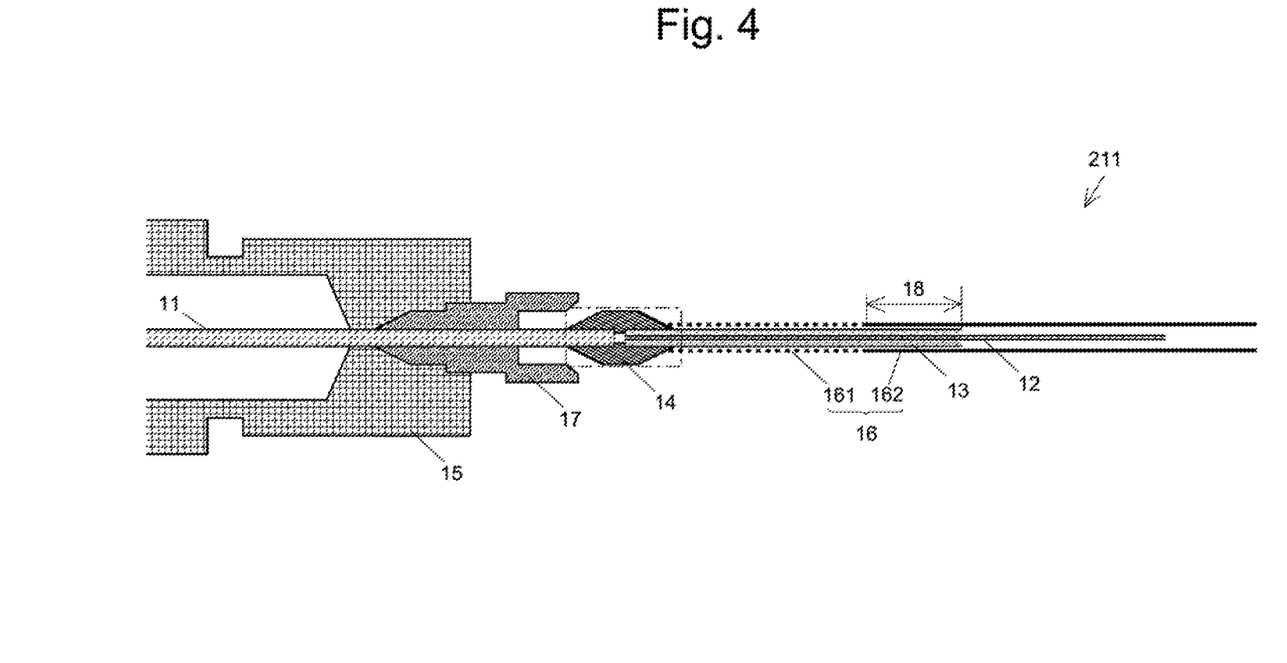
FIG. 4 is a view illustrating a configuration of the ESI sprayer of the embodiment.

FIG. 4 illustrates the configuration of the ESI sprayer 211 of the embodiment. The ESI sprayer 211 is used to nebulize an eluate from the column 113 of the liquid chromatograph 100 into the ionization chamber 210 as a charged droplet. The pipe of the ESI sprayer 211 is divided into an inlet-side pipe 11 and an ESI capillary (outlet-side pipe) 12. The inlet-side pipe 11 corresponds to the first pipe 41, and the ESI capillary 12 corresponds to the second pipe 42. The inlet-side pipe 11 is a pipe made of a polyether ether ketone resin (PEEK), and the ESI capillary 12 is a pipe made of fused silica. These are insulators. These pipe materials are examples, and the pipes made of other insulators may be used.

The ESI capillary 12 of the embodiment is the pipe having a diameter smaller than that of the inlet-side pipe 11, and a protective tube 13 having the same outer diameter as that of the inlet-side pipe 11 is attached to an outer circumference of the ESI capillary 12. The protective tube 13 is also a pipe made of a polyether ether ketone resin (PEEK). The inlet-side pipe 11 and the ESI capillary 12 to which the protective tube 13 is attached are connected to each other by a pipe connecting jig 14 such that the end faces of the inlet-side pipe 11 and the ESI capillary 12 are separated from each other to form the connection gaps. This pipe connecting jig 14 corresponds to the pipe connecting jig 43 explained above. The protective tube 13 is a component different from the pipe protecting member. The protective tube 13 is mainly used so as to be matched with the inner diameter of an outlet-side pipe insertion hole 14b (see FIG. 5) of the pipe connecting jig 14. The protective tube 13 also has an effect that protects the ESI capillary 12. However, the protective tube 13 is a component different from the pipe protecting member 44 explained above.

The ESI sprayer 211 includes a first connection member 15 for attaching the ESI sprayer 211 to a housing of the mass spectrometer 200 and a second connection member 17 for fixing the inlet-side pipe 11 to the first connection member 15. A pipe protecting member 16 (corresponds to the pipe protecting member 44 explained above) constructed with a spring 161 and a sheath unit 162 is attached to the outer circumference of the ESI capillary 12, and one end of the spring 161 is attached to the pipe connecting jig 14.

When the ESI sprayer 211 is not used (when not inserted into the housing of the mass spectrometer 200), the sheath unit 162 covers a portion including the end of the ESI capillary 12 to protect the ESI capillary 12. A base end of the sheath unit 162 (the end on the side of the spring 161) is located in a portion where the ESI capillary 12 is protected by the protective tube 13, and the sheath unit 162 and the protective tube 13 overlap each other in a region 18. Because the protective tube 13 made of PEEK has relatively high rigidity, swinging of the sheath unit 162 supported by the spring 161 having relatively low rigidity can be restricted by extending the base end of the sheath unit 162 to a position where the base end overlaps the protective tube 13 in this way, and a risk of damaging the ESI capillary 12 can be reduced.

Figure 5:
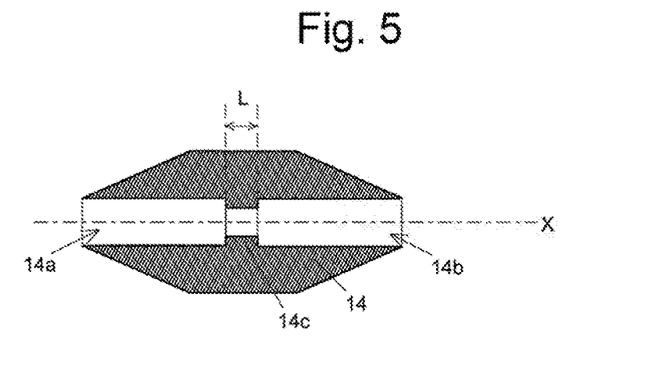
FIG. 5 is a view illustrating a structure of a piping connecting jig used in the embodiment.

As illustrated in FIG. 5, the pipe connecting jig 14 has a cylindrical body in which both ends are tapered (ferrule shape), and a through-hole (an inlet-side pipe insertion hole 14a, an outlet-side pipe insertion hole 14b) having an inner diameter corresponding to the outer diameters of the inlet-side pipe 11 and the protective tube 13 is made in the pipe connecting jig 14, the through-hole having a central axis X parallel to an axial direction of the cylindrical body. Further, a ring-shaped gap forming protrusion 14c having a length L is provided at a boundary between the inlet-side pipe insertion hole 14a and the outlet-side pipe insertion hole 14b in the cylindrical body, the gap forming protrusion 14c protruding inward from a circumferential wall of the cylindrical body. The pipe connecting jig 14 and the pipe protecting member 16 (the spring 161 and the sheath unit 162) of the embodiment are made of stainless steel (SUS). Alternatively, the pipe connecting jig 14 and the pipe protecting member 16 may be made of another conductive material.

When the inlet-side pipe 11 and the ESI capillary 12 are connected using the pipe connecting jig 14, the inlet-side pipe 11 is inserted into the inlet-side pipe insertion hole 14a, and an end face of the inlet-side pipe 11 abuts on the gap forming protrusion 14c. The ESI capillary 12 to which the protective tube 13 is attached is inserted into the outlet-side pipe insertion hole 14b, and the end face of the ESI capillary 12 abuts on the gap forming protrusion 14c. Both the ends of the pipe connecting jig 14 are pressed respectively against the inlet-side pipe 11 and the protective tube 13 using a coupling and a ferrule, and the both the ends are plastically deformed. Consequently, the inlet-side pipe 11 and the ESI capillary 12 are connected with a connection gap interposed between the inlet-side pipe 11 and the ESI capillary 12, the connection gap being decided by the length L of the gap forming protrusion 14c.

In the pipe connecting jig 14, the gap forming protrusion 14c is formed in the ring shape, and the ends of the inlet-side pipe 11 and the ESI capillary 12 contact circumferentially with the inlet-side pipe insertion hole 14a and the outlet-side pipe insertion hole 14b when the inlet-side pipe 11 and the ESI capillary 12 (and the protective tube 13) are inserted into the inlet-side pipe insertion hole 14a and the outlet-side pipe insertion hole 14b, respectively. For this reason, force is locally applied between the gap forming protrusion 14c and the end to deform the gap forming protrusion 14c, and a possibility of changing a length L of the connection gap and the inner diameter of the pipe is reduced. In the embodiment, both the ends are crushed (plastically deformed) using the coupling and the ferrule because the pipe connecting jig 14 made of SUS is used. Alternatively, when the pipe connecting jig 14 made of a material softer than SUS is used, a user can press both the ends against both the pipes by hand.

Figure 6:
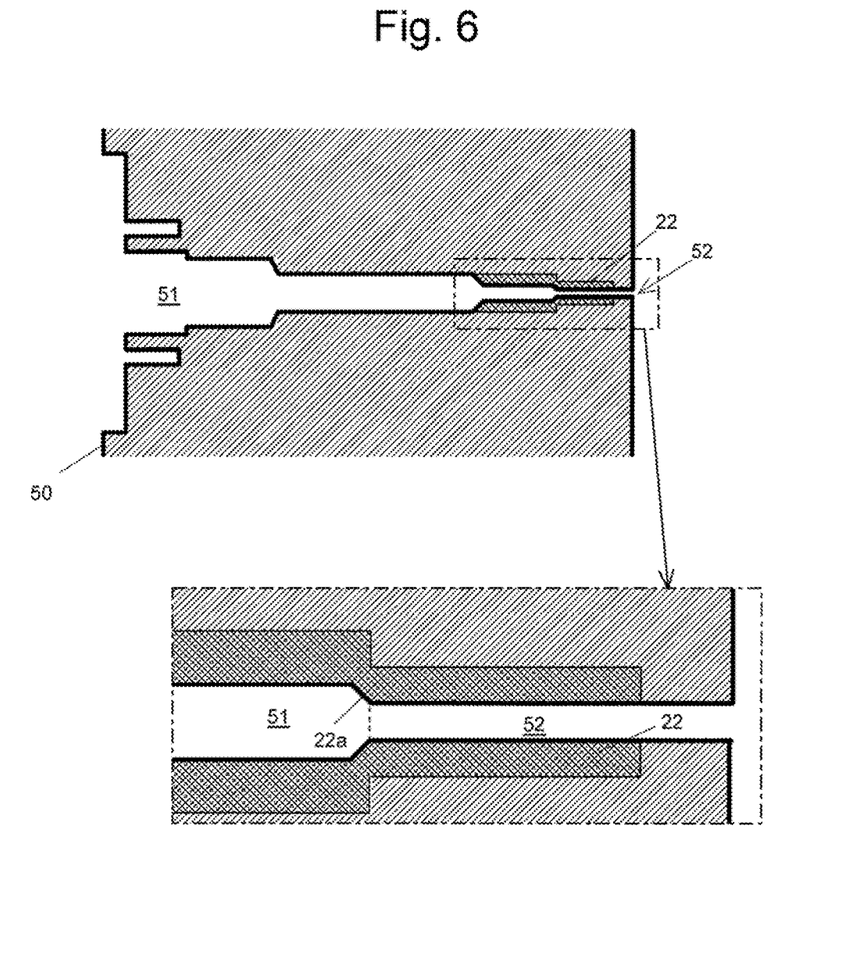
FIG. 6 is a view illustrating shapes of a first hole and a second hole made in the mass spectrometer of a liquid chromatograph mass spectrometer of the embodiment.
Figure 7:
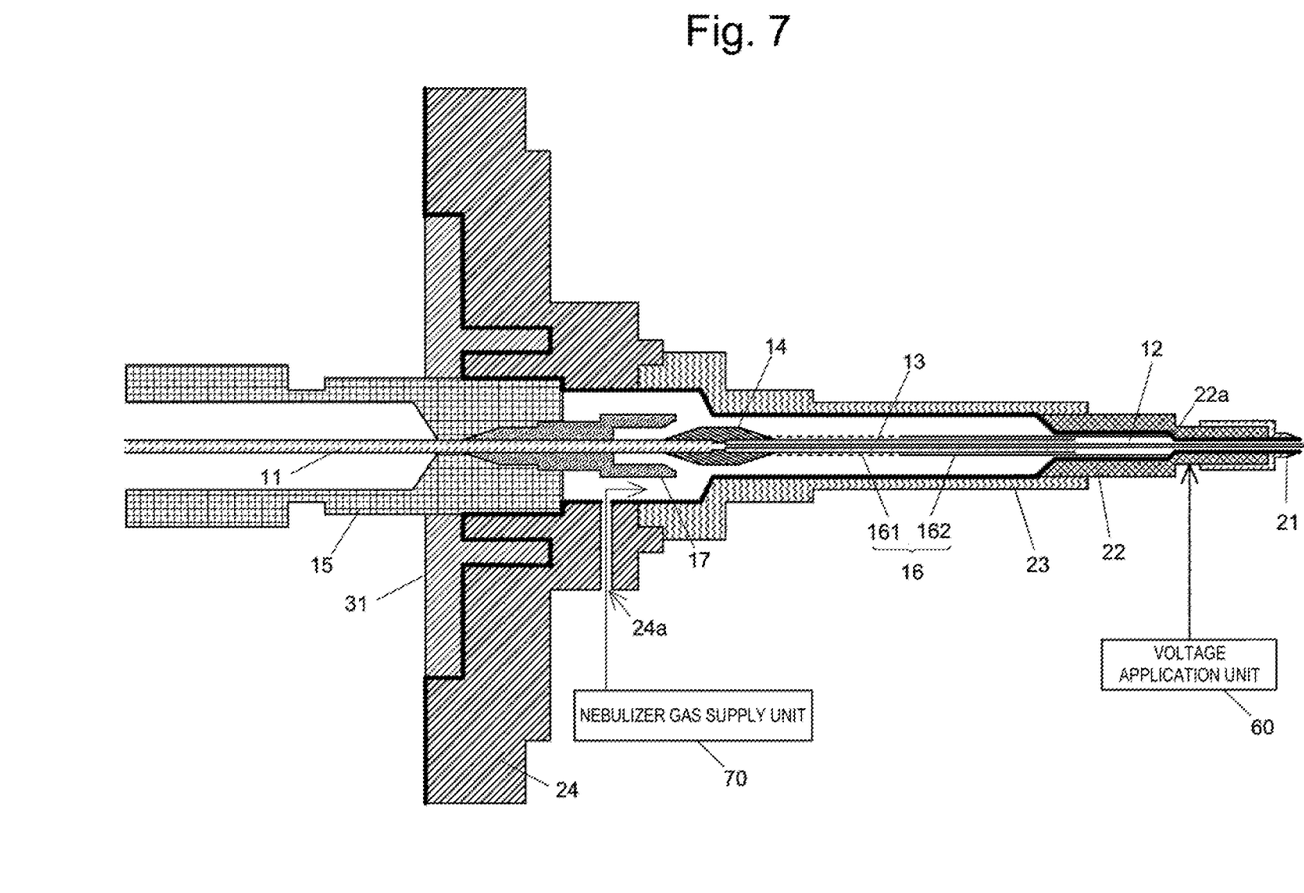
FIG. 7 is a view illustrating a state in which the ESI sprayer of the embodiment is attached to the liquid chromatograph mass spectrometer.

The ESI sprayer 211 in which the inlet-side pipe 11 and a flow channel of the ESI capillary 12 are connected as described above is attached to the housing 50 of the mass spectrometer 200. FIG. 6 illustrates the shapes of the first hole 51 and the second hole 52 made at the mounting position of the ESI sprayer 211 in the housing 50 of the mass spectrometer 200. A lower part of FIG. 6 is an enlarged view illustrating the connection portion between the first hole 51 and the second hole 52 and a vicinity of the outlet of the second hole 52 (a portion surrounded by an alternate long and short dash line in an upper part of FIG. 6). FIG. 7 illustrates a state in which the ESI sprayer 211 is attached to the housing of the mass spectrometer 200.

In FIG. 7, the inside of the portion surrounded by a thick line is the first hole 51 and the second hole 52 in FIG. 6. In the housing 50 of the mass spectrometer 200, an end member 21, an ESI capillary accommodating member 22, an ESI sprayer body accommodating member 23, and an ESI sprayer attaching member 24 are arranged in this order from the end side of the ESI sprayer 211.

The end member 21 is a member having an end formed in a cone shape and an opening formed at the top, and a slight gap is formed between the end member 21 and the end of the ESI capillary 12. A nebulizer gas (to be described later) is supplied through the gap. A sheath unit contact surface 22a is formed on the inner wall surface of the ESI capillary accommodating member 22, the end of the sheath unit 162 abuts on the sheath unit contact surface 22a when the ESI sprayer 211 is inserted, and the ESI capillary 12 is exposed from the sheath unit 162 when the ESI sprayer 211 is further inserted. After the ESI sprayer 211 is inserted into a predetermined position, the ESI sprayer 211 is finally fixed to the ESI sprayer attaching member 24 with a bolt 31.

The ESI capillary accommodating member 22 is made of a conductive material, and the high voltage is applied to the pipe connecting jig 14 through the sheath unit 162 and the spring 161 when the ESI voltage is applied from the voltage application unit 60 to the ESI capillary accommodating member 22 with the ESI sprayer 211 being inserted. In many cases, a partition wall of the ionization chamber 210 and the intermediate vacuum chamber 220 in which the ion introduction opening is formed is grounded, and the ESI voltage having a predetermined potential is applied to the grounding portion. The liquid passing through the connection gap in the gap forming protrusion 14c is charged due to the ESI voltage.

A nebulizer gas flow channel 24a is formed in the ESI sprayer attaching member 24. The nebulizer gas such as a nitrogen gas is supplied from the nebulizer gas supply unit 70 into the first hole 51 through the nebulizer gas flow channel 24a. The nebulizer gas supplied into the first hole 51 reaches the end of the ESI sprayer 211 through a space of the outer circumference of the ESI sprayer 211, and is ejected from the opening of the end member 21. The nebulizer gas is sprayed onto the charged eluate fed from the ESI capillary 12, and the charged elute is nebulized into the ionization chamber 210 as a charged droplet. The nebulized charged droplet is desolvated and ionized in the ionization chamber 210, passes through the heating capillary 212, sequentially enters the intermediate vacuum chamber 220 and the analysis chamber 230, and is subjected to analysis.

As described above, in the ESI sprayer 211 of the embodiment, because the pipe protecting member 16 is also used as the component constituting the conductive path, it is not necessary to add the component for securing the conductive path through which the ESI voltage is applied to the pipe connecting jig 14, and the number of components can be reduced to the minimum, so that the ESI sprayer 211 can be manufactured at low cost. In the ESI sprayer 211 of the embodiment, because the pipe protecting member 16 is disposed so as to cover the entire length of the ESI capillary 12, the ESI capillary 12 is protected by the pipe protecting member 16 when the ESI sprayer 211 is not used (not attached to the housing 50 of the mass spectrometer 200). The eluate from the column 113 can be charged in the connection gap formed between the inlet-side pipe 11 made of an insulating material and the ESI capillary 12.

The pipe connecting jig 14 included in the ESI sprayer 211 of the embodiment connects the inlet-side pipe 11 and the ESI capillary 12 without interposing other jigs. Because the positions of the end faces of the inlet-side pipe 11 and the ESI capillary 12 are defined by the gap forming protrusion 14c, the length L of the gap (connection gap) formed between the end faces is kept constant. Thus, when the high voltage is applied to the ESI capillary accommodating member 22 and applied to the pipe connecting jig 14 through the sheath unit 162 and the spring 161, the liquid sample passing through the gap (connection gap) can be charged with stable efficiency.

In the pipe connecting jig 14 of the embodiment, the gap forming protrusion 14c is formed in a ring shape, and the entire end faces of the inlet-side pipe 11 and the ESI capillary 12 (to which the protective tube 13 is attached) abuts on the ring-shaped gap forming protrusion 14c when the inlet-side pipe 11 and the ESI capillary 12 are inserted into the gap forming protrusion 14c. For this reason, the possibility that the gap forming protrusion 14c is deformed to damage the end faces of the inlet-side pipe 11 and the ESI capillary 12 by locally applying the force to the gap forming protrusion 14c, or the possibility that the force is locally applied to the gap forming protrusion 14c to change the connection gap between the inlet-side pipe 11 and the ESI capillary 12 is reduced.

The pipe connecting jig 14 of the embodiment has the tapered shape toward both the ends. That is, both the ends of the pipe connecting jig 14 have the ferrule-shaped, so that both the ends can plastically be deformed with a smaller force than that of the case where the cylindrical pipe connecting jig is used. For this reason, the possibility of damaging the inlet-side pipe 11 and the ESI capillary 12, or the possibility of crushing the internal space of the gap forming protrusion 14c to reduce the inner diameter of the gap forming protrusion 14c is reduced when both the ends of the pipe connecting jig 14 are plastically deformed.

The pipe connecting jig 14 of the embodiment includes the protective tube 13 attached to the ESI capillary 12 having the diameter smaller than that of the inlet-side pipe 11. When a plurality of types having different inner diameters are previously prepared as the protective tube 13, the protective tube 13 having the appropriate inner diameter corresponding to the outer diameter of the outlet-side pipe is used, and one pipe connecting jig 14 can be used to connect the pipes having different outer diameters. The use of the protective tube 13 can protect an extremely thin, fragile pipe such as the ESI capillary 12 of the embodiment. Furthermore, when at least one of the protective tube 13 and the sheath unit 162 is located outside the ESI capillary 12, excessive bending of the ESI capillary 12 is prevented.

In the embodiment, the inlet-side pipe insertion hole 14a and the outlet-side pipe insertion hole 14b have the same inner diameter. Alternatively, the inlet-side pipe insertion hole 14a and the outlet-side pipe insertion hole 14b may have the different inner diameters.

A plurality of pipe connecting jigs in which the inner diameters of the inlet-side pipe insertion hole 14a and the outlet-side pipe insertion hole 14b are different from each other are previously prepared, and the pipe connecting jig may be used according to the outer diameter of the inlet-side pipe and the outlet-side pipe to be connected to each other. A plurality of pipe connecting jigs having the same inner diameter of the inlet-side pipe insertion hole 14a and the outlet-side pipe insertion hole 14b and different lengths of the gap forming protrusions 14c are previously prepared, and the liquid sample may be charged with a connection gap having the appropriate length according to the ease of charging of the liquid sample and the ionization efficiency of the components contained in the sample.

The above embodiment is merely an example, and can appropriately be changed according to the spirit of the present invention.

In the embodiment, the ESI capillary accommodating member 22 made of the conductive member is disposed in the housing of the mass spectrometer 200, and the ESI voltage is applied from the voltage application unit 60 to the ESI capillary accommodating member 22. Alternatively, the voltage may be applied directly from the voltage application unit 60 to the sheath unit 162. In the embodiment, the nebulizer gas is supplied from the nebulizer gas supply unit 70 to the insides of the first hole 51 and the second hole 52, and is sprayed to the eluate from the column 113, which flows out from the end of the ESI sprayer 211. However, it is not always necessary to use the nebulizer gas. For example, when a very small amount of eluate is introduced into the ESI sprayer 211 like the nano-ESI, the solvent can sufficiently be removed by simply releasing the eluate into the ionization chamber 210, so that it is not necessary to supply the nebulizer gas.

In the embodiment, the inlet-side pipe 11 and the ESI capillary 12 of the ESI sprayer 211 are connected to each other. However, the inlet-side pipe 11 of the ESI sprayer 211 and the outlet-side pipe of the column 113 of the liquid chromatograph 100 can also be used using the pipe connecting jig 14. In the embodiment, the ESI sprayer 211 included in the mass spectrometer of the liquid chromatograph mass spectrometer has been described. However, an ESI sprayer similar to the embodiment can be used as an ionizer of various ion analyzers (such as an ion mobility analyzer and a classifier).

REFERENCE SIGNS LIST 11, 41 . . . Inlet-Side Pipe (First Pipe)
12, 42 . . . ESI Capillary (Second Pipe)
13 . . . Protective Tube
14, 43 . . . Pipe Connecting Jig
14a . . . Inlet-Side Pipe Insertion Hole
14b . . . Outlet-Side Pipe Insertion Hole
14c . . . Gap Forming Protrusion
15 . . . First Connection Member
16, 44 . . . Pipe Protecting Member
161 . . . Spring
162 . . . Sheath Unit
17 . . . Second Connection Member
21 . . . End Member
22 . . . ESI Capillary Accommodating Member
22a . . . Sheath Unit Contact Surface
23 . . . ESI Sprayer Body Accommodating Member
24 . . . ESI Sprayer Attaching Member
24a . . . Nebulizer Gas Supply Flow Channel
50 . . . Housing
51 . . . First Hole
52 . . . Second Hole
60 . . . Voltage Application Unit
70 . . . Nebulizer Gas Supply Unit
100 . . . Liquid Chromatograph
200 . . . Mass Spectrometer
210 . . . Ionization Chamber
40, 211 . . . ESI Sprayer

The invention claimed is:

1. An ESI sprayer configured to be used by being attached to a first hole made in a housing of an ionizer and a second hole made at an end of the first hole, and the second hole having an inner diameter smaller than an inner diameter of the first hole, the second hole having an end communicating with an ionization chamber, the ESI sprayer comprising:
   a) a first pipe having an outer diameter smaller than an inner diameter of the first hole;
   b) a second pipe having an outer diameter smaller than an inner diameter of the second hole;
   c) a pipe connecting jig made of a conductive material and connecting end faces of the first pipe and the second pipe separated from each other; and
   d) a pipe protecting member configured to be an extendable tube made of a conductive material and having an outer diameter smaller than the inner diameter of the first hole and larger than the inner diameter of the second hole, the pipe protecting member having one end fixed to the pipe connecting jig and being disposed so as to cover at least an end of the second pipe.

2. The ESI sprayer according to claim 1, wherein the first pipe and the second pipe are made of an insulating material.

3. The ESI sprayer according to claim 2, further comprising
   g) a voltage application unit configured to apply voltage to the pipe connecting jig.

4. The ESI sprayer according to claim 1, wherein at least a part of the pipe protecting member is made of an elastic member.

5. The ESI sprayer according to claim 1, further comprising
   e) a protective tube disposed in an outer circumference of at least a part of the second pipe.

6. The ESI sprayer according to claim 5, wherein
   at least a part of the pipe protecting member is a tubular member, and
   at least a part of the protective tube is covered with the tubular member.

7. The ESI sprayer according to claim 6, wherein at least one of the two pipe s is made of fused silica.

8. The ESI sprayer according to claim 1, wherein
   in the pipe connecting jig, a through-hole having an inner diameter in which one end corresponds to an outer diameter of the first pipe and the other end corresponds to an outer diameter of the second pipe is made in an axial direction of a tubular body in which at least both ends are plastically deformable, and a gap forming protrusion protruding inward from a circumferential wall of the through-hole is provided in the tubular body.

9. The ESI sprayer according to claim 8, wherein the gap forming protrusion is formed in a ring shape.

10. The ESI sprayer according to claim 8, wherein the pipe connecting jig has a tapered shape toward both ends.

11. The ESI sprayer according to claim 8, further comprising
    f) a pipe diameter adjusting jig attached to a pipe having a diameter smaller than the inner diameter of the through-hole.

12. An ionizer comprising:
    a) a housing in which a first hole and a second hole are made, the second hole being made at an end of the first hole and having an inner diameter smaller than an inner diameter of the first hole and having an end communicating with an ionization chamber;
    b) an ESI sprayer attached to the housing,
    the ESI sprayer including:
    a first pipe having an outer diameter smaller than an inner diameter of the first hole;
    a second pipe having an outer diameter smaller than an inner diameter of the second hole;
    a pipe connecting jig made of a conductive material and connecting end faces of the first pipe and the second pipe separated from each other; and
    a pipe protecting member configured to be an extendable tube made of a conductive material and having an outer diameter smaller than the inner diameter of the first hole and larger than the inner diameter of the second hole, the pipe protecting member having one end fixed to the pipe connecting jig and being disposed so as to cover at least an end of the second pipe,
    c) a voltage application unit configured to apply directly or indirectly voltage to the pipe protecting member.

* * * * *